(12) United States Patent
Braeutigam et al.

(10) Patent No.: US 8,083,181 B2
(45) Date of Patent: Dec. 27, 2011

(54) AIRPLANE HAVING A FUSELAGE SHELL AND A FLOOR STRUCTURE

(75) Inventors: Stefan Braeutigam, Augsburg (DE); Gerhard Lang, Memmingen (DE); Ralf Meyer, Munich (DE); Peter Seitz, Buchloe (DE)

(73) Assignee: EADS Deutschland GmbH, Ottobrunn (DE)

( * ) Notice: Subject to any disclaimer, the term of this patent is extended or adjusted under 35 U.S.C. 154(b) by 515 days.

(21) Appl. No.: 12/140,945

(22) Filed: Jun. 17, 2008

(65) Prior Publication Data

US 2010/0001134 A1 Jan. 7, 2010

(30) Foreign Application Priority Data

Jun. 19, 2007 (DE) .......................... 10 2007 028 098

(51) Int. Cl.
*B64C 1/00* (2006.01)
(52) U.S. Cl. ..................... 244/119; 244/120; 244/118.1; 244/118.5; 244/118.6

(58) Field of Classification Search ................... 244/119, 244/118.1, 120, 118.6, 118.5, 117 R
See application file for complete search history.

(56) References Cited

U.S. PATENT DOCUMENTS

| 4,479,621 A * | 10/1984 | Bergholz ................ 244/117 R |
| 4,799,631 A * | 1/1989 | Humphries et al. ........ 244/118.5 |
| 6,536,710 B1 * | 3/2003 | Bobzien et al. .............. 244/119 |
| 6,769,831 B2 * | 8/2004 | Aquino et al. ............... 403/350 |
| 7,721,992 B2 * | 5/2010 | Keeler et al. ................ 244/119 |
| 2009/0236472 A1 * | 9/2009 | Wood ............................ 244/119 |
| 2010/0044510 A1 * | 2/2010 | Schroeer et al. ............. 244/119 |

FOREIGN PATENT DOCUMENTS

DE 31 41 869 A1 5/1983

* cited by examiner

*Primary Examiner* — Joshua Michener
*Assistant Examiner* — Justin Benedik
(74) *Attorney, Agent, or Firm* — Crowell & Moring LLP

(57) ABSTRACT

An airplane has a fuselage shell and a floor structure that includes cross members and floor plates. Rods are used exclusively to connect the fuselage shell to the floor structure.

10 Claims, 2 Drawing Sheets

AIRPLANE HAVING A FUSELAGE SHELL AND A FLOOR STRUCTURE

BACKGROUND AND SUMMARY OF THE INVENTION

This application claims the priority of German patent document 10 2007 028 098.1-22, filed Jun. 19, 2007, the disclosure of which is expressly incorporated by reference herein.

The invention relates to an airplane having a fuselage and a floor structure that includes cross members and floor plates.

For mounting and integration of a floor into a passenger plane, the cross members of the floor structure are fixedly connected with the fuselage shell structure by riveting them to the fuselage spar elements. This technique is both costly and time-consuming.

The fuselage shell and the floor structure are manufactured separately. In manufacturing the fuselage shell, the spar elements are installed with a certain tolerance, and the floor structure is assembled on an erecting frame, which also gives rise to certain tolerances.

During integration of the floor into the fuselage, tolerances between the floor cross members and the fuselage spars must be compensated by a high-expenditure shimming before drilling and mounting can be started. For shimming, it is know to a person skilled in the art to apply an age-hardening paste directly to the components to be connected. In this manner, differences of up to approximately 0.7 mm can be compensated.

As a result of the increasing use of composite fiber materials in the construction of airplanes, fine coal dust is created during the assembly, which is difficult to remove from the airplane. This results in the risk of corrosion with respect to the aluminum components and in the danger of a short circuit in the electric lines. In addition, high-expenditure health safety measures must be implemented because of the coal dust emission.

As a result of the fixed connection of the passenger floor and the airplane fuselage, the first installation of equipment objects (cable, lines, etc.) is very labor and cost intensive. This also applies to the later maintenance, to necessary repairs and particularly to retrofitting.

German Patent Document DE 31 41 869 A1 describes an airplane where forces are transmitted by horizontal rods in the longitudinal direction of the airplane between the fuselage and the floor structure. The rods are connected with a fuselage spar element at the fuselage end and are connected with the floor plates on the floor structure end. Fittings that are connected directly with the floor to transmit the forces in the transverse direction of the airplane are provided at the fuselage spar elements. In the downward direction, the floor plates are supported by a planar vertically oriented component.

One object of the present invention is to provide an airplane with a floor structure whose integration requires reduced mounting expenditures and reduced assembly time.

This and other objects and advantages are achieved by the fuselage and floor structure according to the invention, in which the connection between the fuselage shell and the floor structure is implemented exclusively by means of rods.

In a preferred embodiment, two groups of rods are used, the first of which is provided in the plane of the floor structure. Together, they form a framework, and preferably they have a longitudinally changeable construction. The second group of rods is arranged below the floor structure for support in the downward direction. They are preferably oriented at a right angle (that is, perpendicularly) with respect to the floor structure, and may be constructed with an exact length as well as a variable length.

By integrating the passenger floor according to the invention exclusively by means of rods, high-expenditure shimming of the cross members of the floor with the spar elements of the fuselage shell can be eliminated. The existing tolerances are compensated by means of adjustable longitudinally variable rods. Thus, drilling of carbon fiber composite materials during the floor integration can also be eliminated, reducing the otherwise resulting health hazard.

The rods, particularly the longitudinally changeable rods, advantageously have a detachable construction, and are inserted, for example, by means of bolts, into prepared receiving bores in the floor cross member and in the fuselage fitting. By making it possible to detach major areas of the rod linkage of the floor from the fuselage structure, fairly large preassembled equipment objects can be integrated in the area of the lateral linkage of the floor to fuselage. This saves considerable costs and time, specifically during the first assembly as well as during maintenance work and upgrades.

The invention makes it possible to transmit all forces in the longitudinal direction of the airplane and in the transverse direction of the airplane exclusively by means of longitudinally changeable rods.

Linking the passenger floor to the airplane fuselage according to the invention achieves a cleaner and faster assembly. During mounting, no coal dust is created as a result of the drilling. The connections are advantageously only inserted/screwed, and, as a result of the longitudinally changeable rods, a linkage of the floor to the airplane fuselage can be established that has little bracing.

DETAILED DESCRIPTION OF THE INVENTION

Figure 1:
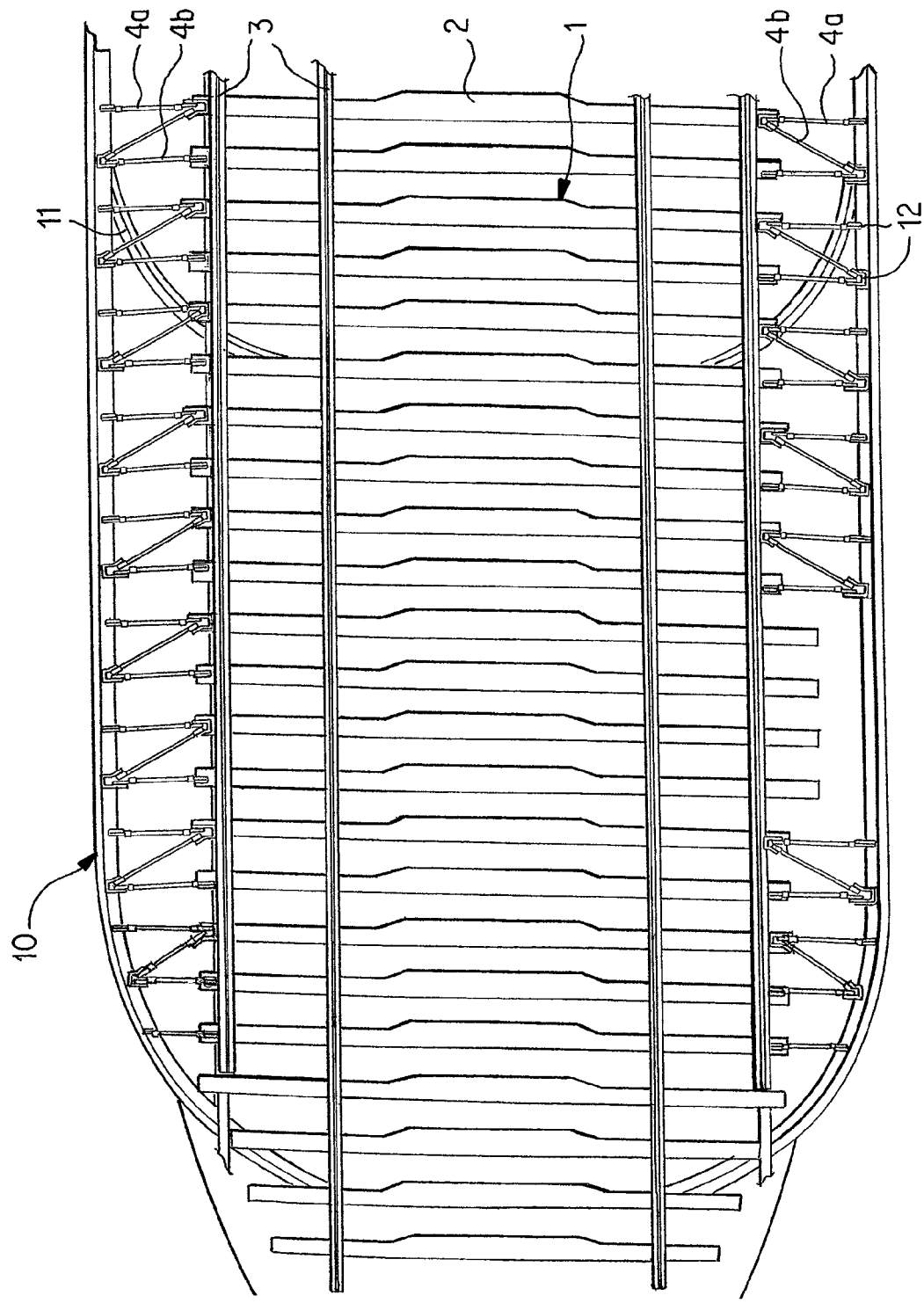
FIG. 1 is a 3-dimensional top view of an embodiment of the linkage according to the invention of a passenger floor 1 to an airplane fuselage 2.

As depicted in FIG. 1, a floor structure 1 consists of cross members 2 (for example, made of carbon fiber reinforced plastic) and seat rails 3, the latter extending in the longitudinal direction of the airplane. (For reasons of clarity, the floor plates which are arranged on the cross members are not shown.) The lateral linkage of the floor 1 to the fuselage shell 10 takes place on both longitudinal sides by longitudinally changeable, adjustable rods 4a, 4b, which each form a framework, with the rods extending in the (horizontal) plane of the floor structure 1.

The rods 4a, 4b extending in the plane of the floor structure are oriented either in the transverse direction of the airplane (rods 4a) or at an acute angle with respect to the transverse direction of the airplane (rods 4b).

On the one side, the rods 4a extending in the transverse direction of the airplane are connected with a cross-member 2 and, on the other side, they are connected with a fuselage spar element 11. Linkage to the fuselage spar element takes place by way of a fuselage-side fitting 12. As illustrated in the drawing, such rods 4a extending in the transverse direction are present at each fuselage spar element 11, specifically on both longitudinal sides of the floor structure 1.

The rods 4b extending at an acute angle (particularly in an angular range of between 30 and 60 degrees) with respect to the transverse direction of the airplane may mainly also transmit forces in the longitudinal direction of the airplane. Each of these rods 4b is also connected with a cross member 2 of the floor structure 1 and a fuselage spar element 11. In the illustrated embodiment, a rod 4b is present only on each second fuselage spar element 11 and correspondingly only on each second cross member 2.

The rods 4a, 4b are advantageously constructed such that they can subsequently be detached, for example, by means of a bolt with a lock nut. This configuration has special advantages when equipment is integrated within the airplane fuselage, because the rapid detachment of the rods affords good accessibility to the corresponding space.

Figure 2:
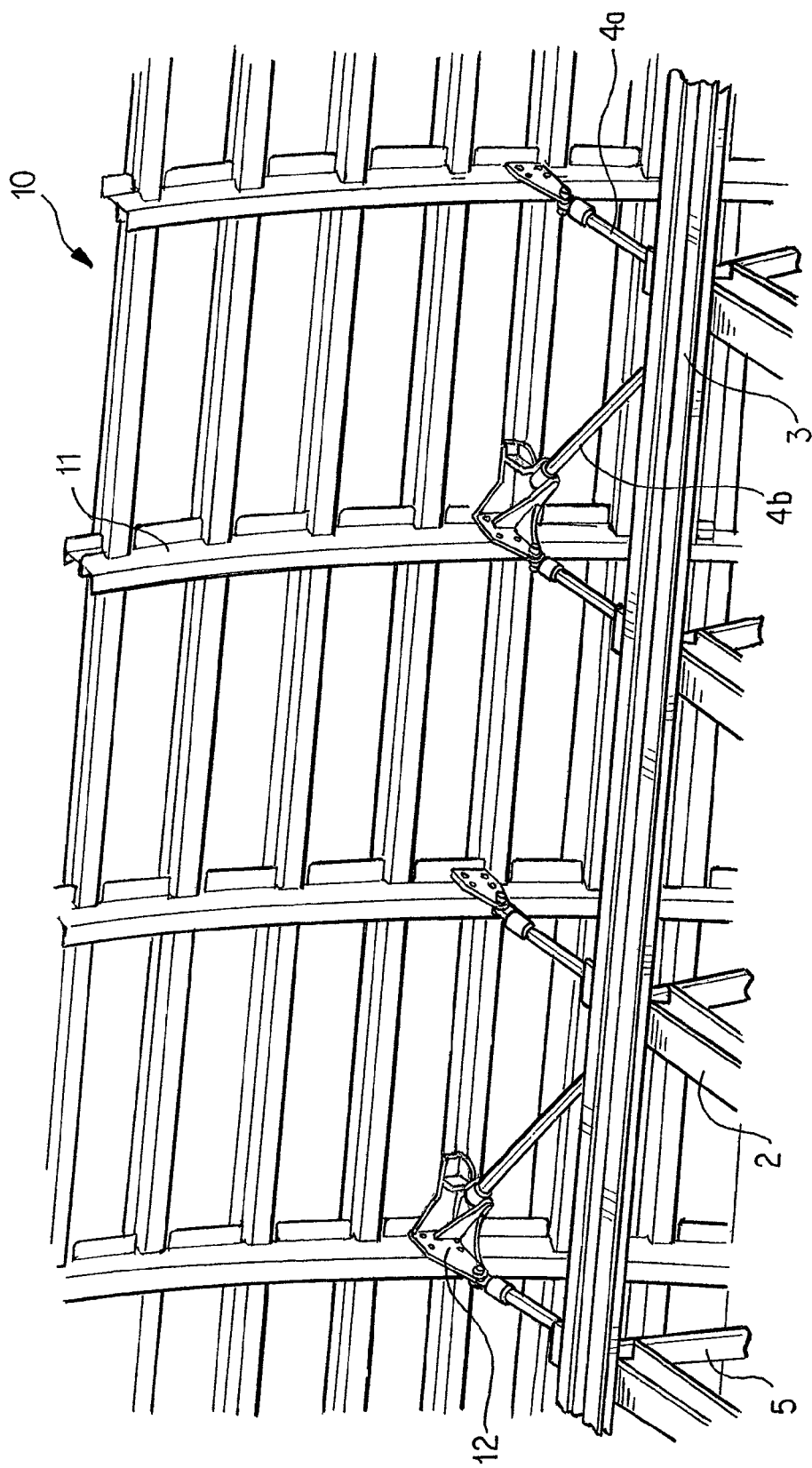
FIG. 2 is a 3-dimensional side view of an embodiment of the linkage according to FIG. 1.

In FIG. 2, reference number 5 indicates a second group of rods which are arranged below and perpendicular to the floor structure.

The rods 5 of the second group are also connected at one end with a cross member 2 of the floor structure and at the other end with a fuselage spar element 11. They may be constructed to be longitudinally changeable or may have a fixed length. Like the rods of the first group, they may be constructed such that they can subse-quently be detached (for example, by means of a bolt with a pertaining lock nut). Advantageously, a so-called crash element (constructed, for example, as a separating ring) can in each case he worked into these rods for absorbing and dissipating energy.

The mounting of the floor takes place as follows:

The fuselage-side fitting 12 is already integrated during the assembly of the fuselage shell. The floor structure 1 is preassembled on a frame, outside the airplane. The floor is then assembled with the fuselage using adjustable rods 4a, 4b that are inserted by means of bolts in prepared receiving bores in the floor cross member and in the fuselage-side fitting. Existing tolerances are compensated by the adjustable rods.

The length of the rods can be adjusted in a targeted manner. For example, the length of the rods can be adjusted by means of a screwing thread, in which case, the possible increase or decrease of the length may be in the range of several millimeters to centimeters.

The rods may consist of a fiber composite material (for example, carbon fiber reinforced plastic).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An airplane comprising:
   a fuselage shell;
   a floor structure that includes floor plates and cross members which substantially traverse said floor structure in a transversal direction of said airplane; and
   rods that connect the fuselage shell and the floor structure; wherein,
   the fuselage shell and the floor structure are connected to and supported exclusively by said rods; and
   one end of each of said rods is attached to a single one of said cross members.

2. The airplane according to claim 1, wherein at least one of the rods has an adjustable length, for connecting the fuselage shell and the floor structure.

3. The airplane according to claim 2, wherein said rods include a first group of rods which extend in the plane of the floor structure, and all have an adjustable length.

4. The airplane according to claim 3, wherein each of the rods of the first group is connected with a cross member of the floor structure.

5. The airplane according to claim 3, wherein the first group of rods includes rods that are oriented parallel to the transverse direction of the airplane.

6. The airplane according to claim 5, wherein one of said rods that are oriented parallel to the transverse direction of the airplane is arranged at each spar element of the fuselage shell.

7. The airplane according to claim 3, wherein the first group of rods further includes rods that are oriented at an acute angle with respect to the transverse direction of the airplane.

8. The airplane according to claim 7, wherein one of said rods that are oriented at an acute angle with respect to the transverse direction of the airplane is arranged on each second spar element of the fuselage shell.

9. The airplane according to claim 1, wherein the rods are detachable.

10. The airplane according to claim 1, further comprising a second group of rods, among said rods which extend below, and at a right angle with respect to, the floor structure.

* * * * *